United States Patent Office 3,429,663
Patented Feb. 25, 1969

3,429,663
DEFLUORINATION OF PHOSPHORIC ACID
George B. Shearon and Gerald L. Stevenson, Lakeland, Fla., assignors to International Minerals & Chemical Corporation, a corporation of New York
No Drawing. Filed Jan. 6, 1965, Ser. No. 423,823
U.S. Cl. 23—165                    11 Claims
Int. Cl. C01b 25/22

ABSTRACT OF THE DISCLOSURE

Animal feed grade phosphoric acid is produced from wet process superphosphoric acid containing excessive fluoride by sparging steam through the superphosphoric acid in the presence of silica either concomitantly with, or shortly after, the dilution and hydrolysis of the superphosphoric acid.

---

This invention relates generally to improvements in the defluorination of phosphoric acid prepared by the wet process method. In one of its aspects this invention relates to a method for defluorinating phosphoric acid containing fluorine in excess of that permissible in animal feed phosphates to provide an acidic phosphatic solution of substantially reduced fluorine content so that it may be used directly to prepare animal feed ingredients. In its preferred aspect this invention relates to a method for producing an animal feed grade phosphoric acid from wet process superphosphoric acid containing excessive fluorine.

There has developed in recent years a substantial market for phosphates, as for example, calcium phosphates, of a grade and quality useful as an animal feed supplement. In feed grade phosphates the weight ratio of phosphorus, calculated as elemental phosphorus, to fluorine, calculated as elemental fluorine, is preferably greater than about 50, and still more preferably greater than about 100. Feed grade phosphates may be produced directly from acidic phosphatic solutions provided the fluorine content of the solution is not too high. However, inasmuch as phosphate rock in the natural state contains significant amounts of fluorine, acidic phosphate solutions prepared therefrom also contain significant, and generally excessive, amounts of fluorine.

Various methods have been devised in the past to effect defluorination of wet process phosphoric acid so as to enable its direct use in the preparation of animal feed supplements. Such methods are exemplified by the processes presented in Hettrick U.S. Patent No. 2,165,000, Gloss U.S. Patent No. 2,987,376 and Smalter U.S. Patent No. 3,074,780. While the process described in the latter two patents have provided reasonably good methods of effecting defluorination of wet process phosphoric acid, because of the high energy requirements as exemplified by the amount of steam required to produce a phosphoric acid of given $P_2O_5$ concentration and P/F ratio, these processes are approaching technical obsolescence. There is, therefore, a need for new and more economical processes.

A recent innovation in improved methods for the production of feed grade phosphoric acid solutions is described in co-pending application Ser. No. 423,586, filed Jan. 5, 1965, wherein clarified dilute wet process phosphoric acid is concentrated to a superphosphoric acid having a $P_2O_5$ concentration in the range of about 65 to about 75% by weight and a P/F ratio of about 80, followed by dilution thereof to a phosphoric acid solution having a $P_2O_5$ concentration in the range of about 50 to 60% by weight, generally about 54%. While this process is indeed an improvement from the standpoint of steam requirements over previously known methods, the consistent achievement of a final product having a P/F ratio in excess of 100 has been difficult without extending the residence time in the evaporator. That is, as is very often the case, the last traces of fluorine are more difficult to remove than the first. In accordance with the present invention we have discovered that substantial improvement in P/F ratio of wet process phosphoric acid can be achieved with a very small amount of steam if the superphosphoric acid is subjected to steam treatment in the presence of colloidal silica when dilution and hydrolysis of the superphosphoric acid is effected. In view of the difficulty with which last traces of fluorine are normally removed from material undergoing defluorination, the ease with which further defluorination could herein be effected was a surprising and most unexpected discovery. Further, it is not clear and we are unable to explain the mechanism by which the improvement is effected.

It is, therefore, an object of this invention to provide improvements in the defluorination of phosphoric acid prepared by the wet process method.

It is another object of this invention to provide an improved method for defluorinating phosphoric acid containing fluorine in excess of that permissible in animal feed grade phosphates to produce an acidic phosphatic solution of substantially reduced fluorine content so that it can be used directly to prepare animal feed ingredients.

It is a further object of this invention to provide a method for producing animal feed grade phosphoric acid from wet process superphosphoric acid containing excessive fluorine.

In its broadest aspect the method of the present invention involves subjecting wet process superphosphoric acid having an undesirable quantity of fluorine to direct contact with steam in the presence of colloidal silica, preferably concomitantly with dilution and hydrolysis of the superphosphoric acid, or at least shortly after the superphosphoric acid is diluted and hydrolyzed. The process can be conducted batchwise or continuously, but is preferably conducted on a continuous basis.

In general, the wet process superphosphoric acid starting material of the present method is manufactured by the acidulation of fluorine-containing phosphate rock with sulfuric acid. After acidulation the concomitantly produced gypsum is separated and the "green" acid concentrated to a suitable strength for further processing, usually in excess of 45% $P_2O_5$ content, and more generally 52 to 56% $P_2O_5$, with 54% being more or less a standard. After clarification to separate solids, such as compounds containing calcium, iron, aluminum, silica and the like, the 54% acid is concentrated to a range of about 65% to about 75% $P_2O_5$ and is referred to as superphosphoric acid. Concentration is normally effected by contacting a relatively thin film of the acid against a heat exchange surface which is usually the surface of a tube in which the acid is contained. Heat is normally supplied by indirect heat exchange with steam. During heating and concentration there is an evolution of steam and fluorine compounds so that some defluorination, and indeed, a major amount of defluorination, takes place. The product so produced has a $P_2O_5$ content in the range of 65 to 75% by weight, generally in the range of 67 to 71% by weight of the acid. Depending upon the conditions employed, the superphosphoric acid produced will have a P/F ratio in the range from about 50 to about 120 and normally about 80 to 90. Consistency of high P/F ratios, viz, in excess of 100, normally require extended evaporation, thus increasing the steam requirements for effecting said result. A preferred superphosphoric acid starting material is produced by the method described in co-pending application Ser. No. 423,586, filed Jan. 5, 1965. In the process therein described the 54% clarified acid is admixed with silica-containing diatomaceous earth prior to evaporation to produce the superphosphoric acid. Thus, the superphosphoric acid containing the silica recovered from the concentration step can be especially herein employed. It will be appreciated, however, that superphosphoric acid produced by other means can be used.

In carrying out the method of the present invention on a batchwise basis, fluorine-containing superphosphoric acid is charged to a steam contacting vessel along with colloidal silica and water or dilute, viz, about 30% by weight $P_2O_5$, clarified wet process phosphoric acid in amount sufficient to effect dilution and hydrolysis of the superphosphoric acid to a $P_2O_5$ content less about 60, and generally about 50 to 55% $P_2O_5$. The temperature of the superphosphoric acid before admixture can vary between about 150 and 475° F., but is preferably hot, at a temperature of about 225° F. The water or dilute clarified wet process phosphoric acid employed for dilution and hydrolysis is preferably hot, so that steam consumption is minimized, but can vary between about 70 and about 200° F. without adversely affecting the process. The contacting vessel is preferably provided with means to effect agitation as well as means to effect sparging or direct contact of steam with the liquid acid. In some instances sparging provides sufficient agitation. Steam is preferably admitted to the vessel at the time charging takes place. In the preferred practice, the superphosphoric acid, water, silica and steam are added concomitantly. However, the superphosphoric acid may be added to a predetermined quantity of water to effect dilution and hydrolysis followed by steam sparging. During sparging liquid acid is maintained at a temperature in the range from about 175° F. to 420° F., preferably about 270 to 325° F., and most usually at about 300° F. The temperature of the acid is maintained at the desired temperature by the combination of several means; to wit, the heat of dilution of the acid and the steam sparged therethrough. If desired, other external means of applying heat can be employed although this is not usually necessary. The steam can be superheated, at temperatures between 225° F. and 450° F., saturated or even unsaturated at convenient pressures such as from 5 to 150 lbs. p.s.i.g. The steam contacting takes place over a period of from about ½ to about 2 hours, preferably about 1½ hours, and at a rate equal to about 0.04 to about 0.25 lb. of steam per lb. of $P_2O_5$ contacted, preferably about 0.15 lb. of steam per pound of $P_2O_5$. Larger amounts of steam and longer contacting periods can be employed if exceptionally high $P/F$ ratios are needed or desired. We have found, however, that an optimum product having a $P/F$ ratio of about 150 can be consistently produced under the conditions and rates described starting with an initial superphosphoric acid having a $P/F$ ratio of about 80.

During the steam contacting step, steam and fluorine-containing compounds are continuously evolved from the liquid acid and pass to a suitable scrubbing operation. If desired, the latent heat contained in the evolved steam and fluorine gases may be partly recovered by suitable heat exchange, as for example, with the water used to dilute the superphosphoric acid. After the steam treatment, the defluorinated diluted acid is recovered.

As mentioned earlier, the steam treatment, dilution and hydrolysis takes place in the presence of colloidal silica. This silica may be added to the acid directly or may be present therein by virtue of having been employed in the original concentration step, as described in co-pending application Ser. No. 423,586, filed Jan. 5, 1965. The silica is present in the amount of about 0.005 to about 0.15 lb. of silica per lb. of $P_2O_5$ in the acid. The amount of silica employed is not critical, but is preferably the least amount which can be used to achieve good defluorination. A preferred amount is about 0.01 lb. of silica per lb. of $P_2O_5$. The silica may be refined particulate silica having a surface area in excess of about 25 sq. meters per gram, and is as generally described in Gloss U.S. Patent No. 2,987,376. For reasons of economics it is preferred to use conventional diatomaceous earth having a silica content of about 85% by weight.

In carrying out the process on a continuous basis, initiation thereof is effected similarly as with a batch process. Withdrawal of the defluorinated acid, however (and charging of additional fluorine-containing superphosphoric acid and water), does not commence until the initial charge has been adequately treated as hereinbefore described. The conditions of temperatures, time, steam temperatures, pressures and rates, and other conditions as hereinbefore described with respect to batch operations apply in a continuous operation of the method. Obviously, the withdrawal of defluorinated acid is coordinated with the charging of additional fluorine-containing superphosphoric acid, water, silica, etc. to maintain the desired volume and residence time needed for adequate defluorination.

The dilute defluorinated phosphoric acid recovered from the method of our invention will contain $P_2O_5$ at a concentration below 60% by weight, generally between about 50 and about 55%, and will have a $P/F$ ratio ranging from about 100 to about 300, generally about 150, depending upon the $P/F$ ratio of the starting superphosphoric acid and the extent of steam treatment. The silica contained therein may be removed by filtration, centrifugation, or the like, if desired. In view of the small amount of silica present, however, its removal is not necessary for most commercial end uses for phosphoric acid.

The following example is intended to illustrate the underlying principles of the method of the present invention and is not to be construed as unduly limiting.

Example

Hot fluorine-containing superphosphoric acid, at a temperature of about 200° F., containing about 68% by weight $P_2O_5$ and having a $P/F$ ratio of about 60, and containing about 0.02 lb. of silica per lb. of $P_2O_5$ was continuously charged at a rate of about 30,000 lbs./hr. to an agitated reaction vessel maintained at a reasonably constant volume of about 3,500 gallons. Water at a temperature of about 75° F. was concomitantly and continuously charged to said vessel at a rate of about 5,000 lbs./hour. Steam at a temperature of about 400° F. and pressure of about 50 p.s.i.g. was continuously sparged beneath the surface of the liquid acid at a rate of about 2,500 lbs./hr. The temperature of the liquid in the vessel was maintained at about 300° F. Phosphoric acid having a $P_2O_5$ content of about 56% by weight and $P/F$ ratio of about 130 was continuously recovered at a rate of about 35,000 lbs./hr. The average residence time in the reaction vessel was about 1.45 hours, and the ratio of steam employed to $P_2O_5$ treated was about 0.12 lb. of steam per lb. of $P_2O_5$. The phosphoric acid was subsequently used to prepare animal feed grade dicalcium phosphate by conventional means known in the art.

While this invention has been described and exemplified in terms of preferred embodiments and procedures, it will be appreciated that modifications can be made without departing from the spirit and scope of the invention.

The embodiments of the invention in which an exclusive property or privilege is claimed are defined as follows:

1. A method for removing fluorine from wet process phosphoric acid containing flourine in undesirable amounts which comprises diluting and hydrolyzing a fluorine-containing superphosphoric acid having a $P_2O_5$ content in excess of about 65% by weight obtained by concentration of dilute wet process phosphoric acid to obtain a dilute phosphoric acid solution having a $P_2O_5$ content less than 60%; maintaining said dilute phosphoric acid solution at a temperature in the range between about 175 and about 420° F.; maintaining in said dilute phosphoric acid solution particulate silica in the amount of 0.005 to about 0.15 lb. of silica per lb. of $P_2O_5$ present; passing steam through said dilute phosphoric acid solution at a pressure in the range between about 5 and about 150 p.s.i.g. for a period of at least about one-half hour whereby fluorine-containing compounds are vaporized and removed from said dilute phosphoric acid solution; and recovering a phosphoric acid solution having a $P/F$ weight ratio in excess of 100 and greater than the $P/F$ ratio of the starting superphosphoric acid.

2. A method according to claim 1 wherein said superphosphoric acid has a $P_2O_5$ concentration in the range between 65 to 75 weight percent and a $P/F$ weight ratio between about 50 and about 150 and the phosphoric acid solution recovered has a $P_2O_5$ concentration in the range of about 50 to about 60% and a $P/F$ ratio in the range of 100 to 300.

3. A method according to claim 1 wherein the steam employed is at a temperature in the range between about 225 and 450° F. and in an amount in the range between about 0.04 and about 0.25 lb. per lb. of $P_2O_5$ recovered in the defluorinated phosphoric acid.

4. A method in accordance with claim 1 wherein the silica employed is in the form of diatomaceous earth and has a surface area in excess of 25 sq. meters per gram.

5. A method in accordance with claim 1 wherein the dilute phosphoric acid solution is maintained at a temperature of about 270 to about 325° F. and steam passed therethrough for a period of one-half hour to about two hours in an amount of about 0.04 to about 0.25 lb. per lb. of $P_2O_5$ recovered from the method.

6. A method in accordance with claim 1 wherein dilute aqueous phosphoric acid having a $P_2O_5$ content of about 30% by weight is employed for the purpose of diluting and hydrolyzing the superphosphoric acid employed.

7. A method in accordance with claim 1 wherein superphosphoric acid containing silica in the specified concentration, water in an amount needed to produce the specified concentration and steam, are continuously added to a treating zone and defluorinated phosphoric acid continuously recovered therefrom.

8. A method in accordance with claim 1 including the final step of separating the silica from the product phosphoric acid.

9. A method for removing fluorine from wet process phosphoric acid containing fluorine in undesirable amounts which comprises continuously adding to a treating zone (1) superphosphoric acid having a $P_2O_5$ concentration in the range from about 65 to about 75% and a $P/F$ weight ratio in the range of 50 to 100 obtained by the concentration of clarified wet process phosphoric acid, (2) particulate silica having a surface area in excess of 25 meters per gram in an amount of about 0.01 lb. per lb. of $P_2O_5$, (3) water in an amount sufficient to hydrolyze said superphosphoric acid and provide a concentration in a dilute phosphoric acid of $P_2O_5$ in the range of from about 50 to about 60%, and (4) steam at a temperature within the range of about 225 to about 450° F. and a pressure of about 5 to about 150 p.s.i.g.; maintaining said treating zone at a temperature in the range of about 270 to about 325° F.; recovering from said treating zone a defluorinated phosphoric acid having a $P_2O_5$ concentration in the range of about 50 to about 60% and a $P/F$ ratio of about 100 to about 300; and controlling the addition of superphosphoric acid and water and the withdrawal of defluorinated phosphoric acid to provide a residence time in said treating zone in the range from about ½ to about 2 hours.

10. A method in accordance with claim 1 wherein said superphosphoric acid is diluted and hydrolyzed concomitantly with the passage of steam therethrough.

11. A method in accordance with claim 1 wherein steam is passed through said dilute phosphoric acid solution subsequent to the dilution and hydrolysis of said superphosphoric acid.

References Cited

UNITED STATES PATENTS

| 2,895,799 | 7/1959 | LeBaron et al. | 23—165 X |
| 2,962,357 | 11/1960 | Williams et al. | 23—165 |
| 3,074,780 | 1/1963 | Smalter | 23—165 |
| 3,151,941 | 10/1964 | Hollingsworth et al. | 23—165 |

OSCAR R. VERTIZ, *Primary Examiner.*

A. J. GREIF, *Assistant Examiner.*

UNITED STATES PATENT OFFICE
CERTIFICATE OF CORRECTION

Patent No. 3,429,663                          February 25, 1969

George B. Shearon et al.

It is certified that error appears in the above identified patent and that said Letters Patent are hereby corrected as shown below:

Column 1, line 14, "fluoride" should read -- fluorine --; line 50, "2,165,000" should read -- 2,165,100 --.

Signed and sealed this 7th day of April 1970.

(SEAL)
Attest:

Edward M. Fletcher, Jr.                    WILLIAM E. SCHUYLER, JR

Attesting Officer                              Commissioner of Patents